(12) United States Patent
Jacobsen et al.

(10) Patent No.: US 11,887,123 B1
(45) Date of Patent: Jan. 30, 2024

(54) PIEZOELECTRIC BIOMETRIC CARD SECURITY

(71) Applicant: Wells Fargo Bank, N.A., San Francisco, CA (US)

(72) Inventors: Brian J. Jacobsen, Elm Grove, WI (US); Benjamin Taylor, Williston, VT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 297 days.

(21) Appl. No.: 17/486,519

(22) Filed: Sep. 27, 2021

Related U.S. Application Data (63) Continuation of application No. 15/217,183, filed on Jul. 22, 2016, now Pat. No. 11,132,682.

(51) Int. Cl.
*G06Q 20/40* (2012.01)
*G06Q 20/34* (2012.01)
*G06Q 20/20* (2012.01)

(52) U.S. Cl.
CPC ..... *G06Q 20/40145* (2013.01); *G06Q 20/206* (2013.01); *G06Q 20/34* (2013.01)

(58) Field of Classification Search
CPC . G06Q 20/40145; G06Q 20/206; G06Q 20/34
See application file for complete search history.

(56) References Cited

U.S. PATENT DOCUMENTS

| | | | |
|---|---|---|---|
| 5,920,640 A | 7/1999 | Salatino et al. | |
| 6,898,299 B1 | 5/2005 | Brooks | |
| 7,013,031 B2 | 3/2006 | Kim et al. | |
| 7,278,025 B2 | 10/2007 | Saito et al. | |
| 7,341,181 B2 | 3/2008 | Bonalle et al. | |
| 7,543,739 B2 | 6/2009 | Brown et al. | |
| 7,597,267 B2 | 10/2009 | Miyazaki | |
| 7,882,364 B2 | 2/2011 | Watanabe | |
| 8,276,816 B2 | 10/2012 | Gardner | |

(Continued)

FOREIGN PATENT DOCUMENTS

| | | |
|---|---|---|
| CN | 2845028 | 12/2006 |
| CN | 203204664 | 9/2013 |

(Continued)

OTHER PUBLICATIONS

Prosecution History from U.S. Appl. No. 15/217,183, dated Oct. 15, 2018 through Aug. 27, 2021, 175 pp.

*Primary Examiner* — Michael Jared Walker
(74) *Attorney, Agent, or Firm* — Shumaker & Sieffert, P.A.

(57) ABSTRACT

Systems and methods provide for authenticating a user attempting to make a payment using a piezoelectric device are disclosed herein. In an embodiment, the piezoelectric device can be embedded on a credit card, debit card, or other form of payment card and signals generated by the piezoelectric device can be used to authenticate the user when making the payment. For example, the user can squeeze or manipulate the piezoelectric device in a specific predetermined pattern and the resulting electric charge or induced current generated by the piezoelectric device can facilitate transmitting a signal to a point of sale device, and the point of sale device can authenticate the user based on the signal. In other embodiments, the piezoelectric device can contain circuitry and/or logic that can authenticate the user and send a confirmation signal to the point of sale device to authenticate the payment.

20 Claims, 10 Drawing Sheets

(56) References Cited

U.S. PATENT DOCUMENTS

| | | |
|---|---|---|
| 8,290,150 B2 | 10/2012 | Erhart et al. |
| 8,326,004 B2 | 12/2012 | Lee et al. |
| 8,429,085 B2 | 4/2013 | Faith et al. |
| 8,600,863 B2 | 12/2013 | Jain et al. |
| 8,646,696 B2 | 2/2014 | Slikkerveer et al. |
| 8,694,793 B2 | 4/2014 | Evans |
| 8,733,632 B2 | 5/2014 | Faith et al. |
| 8,918,900 B2 | 12/2014 | Saito |
| 9,082,054 B2 | 7/2015 | MacPherson et al. |
| 11,132,682 B1 | 9/2021 | Jacobsen et al. |
| 2002/0043566 A1 | 4/2002 | Goodman et al. |
| 2004/0177045 A1 | 9/2004 | Brown |
| 2006/0000894 A1 | 1/2006 | Bonalle et al. |
| 2006/0016868 A1 | 1/2006 | Bonalle et al. |
| 2006/0016872 A1 | 1/2006 | Bonalle et al. |
| 2006/0016876 A1 | 1/2006 | Bonalle et al. |
| 2006/0020558 A1 | 1/2006 | Bonalle et al. |
| 2006/0093192 A1 | 5/2006 | Bechtel |
| 2007/0011023 A1 | 1/2007 | Silverbrook |
| 2008/0037842 A1 | 2/2008 | Gutta et al. |
| 2008/0148393 A1 | 6/2008 | Wendt |
| 2009/0145972 A1 | 6/2009 | Evans |
| 2009/0152364 A1 | 6/2009 | Spivey, Jr. |
| 2009/0240625 A1 | 9/2009 | Faith et al. |
| 2010/0284565 A1 | 11/2010 | Benkley et al. |
| 2012/0235958 A1 | 9/2012 | Chen et al. |
| 2013/0041776 A1 | 2/2013 | Schunemann |
| 2013/0094715 A1 | 4/2013 | Benkley et al. |
| 2013/0169541 A1 | 7/2013 | Cabos et al. |
| 2015/0046996 A1 | 2/2015 | Slaby et al. |
| 2015/0073983 A1 | 3/2015 | Bartenstein et al. |
| 2015/0095219 A1 | 4/2015 | Hurley |
| 2015/0161369 A1 | 6/2015 | Weksler et al. |
| 2015/0212722 A1 | 7/2015 | Leung et al. |
| 2015/0249920 A1 | 9/2015 | Lestario et al. |
| 2015/0286922 A1 | 10/2015 | Saito et al. |
| 2016/0028715 A1 | 1/2016 | Sivashanmugam et al. |
| 2016/0188026 A1 | 6/2016 | Klinghult |
| 2016/0270706 A1 | 9/2016 | Imran |
| 2016/0379217 A1 | 12/2016 | Hammad |
| 2017/0124445 A1 | 5/2017 | Howard |
| 2017/0161709 A1 | 6/2017 | Tunnell et al. |
| 2017/0323285 A1 | 11/2017 | King |
| 2018/0012227 A1 | 1/2018 | Tunnell et al. |
| 2018/0365689 A1 | 12/2018 | Gardiner et al. |
| 2020/0019956 A1 | 1/2020 | Tanaka |

FOREIGN PATENT DOCUMENTS

| | | |
|---|---|---|
| EP | 1259930 | 6/2005 |
| FR | 2736179 | 1/1997 |
| GB | 2430785 | 6/2008 |
| JP | 2004173827 | 6/2004 |
| JP | 2006134233 | 5/2006 |
| KR | 20020039973 | 5/2002 |
| KR | 20080109327 | 12/2008 |
| WO | 2009148980 | 12/2009 |

PIEZOELECTRIC BIOMETRIC CARD SECURITY

This application is a continuation of US patent application Ser. No. 15/217,183, filed 22 Jul. 2016, the entire contents of which is incorporated herein by reference.

BACKGROUND

Authenticating credit card payments currently requires the use of signatures or passcodes, each of which have a number of drawbacks. Signatures can be forged and passcodes can be forgotten.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate authenticating a payment using a piezoelectric biometric security device. In an embodiment, a credit card or other payment card can have an area with a piezoelectric material that generates a signal that can be used to authenticate a user making the payment. In other embodiments, a separate piezoelectric security device can be used to authenticate mobile payments or payments made via a separate credit card. The piezoelectric biometric security device can authenticate users based on grip patterns, pressure sequences, and determined biometric information matching stored identification information.

For these considerations, as well as other considerations, in one or more embodiments, a system can include a memory to store computer-executable instructions and a processor, coupled to the memory, to facilitate execution of the computer-executable instructions to perform operations. The operations can include receiving a transmission from an authentication device, wherein the transmission comprises data powered or generated by a piezoelectric effect material on the authentication device. The operations can also include determining identification information based on the data generated by the piezoelectric effect material, wherein the identification information is associated with an authentication device user. The operations can also include authorizing a transaction in response to matching the identification information to stored baseline identification information associated with a credit card account associated with the authentication device.

In another embodiment, an authenticator device can include a piezoelectric effect material that generates an electric charge or induces an electric current in response to realizing mechanical stress. The authenticator device can also include an integrated circuit that facilitates matching the electric charge or induced electric current to a predetermined electric charge or electric current pattern. The authenticator device can also include authorizing a transaction in response to matching the identification information to stored baseline identification information associated with a credit card account associated with the authentication device.

In another embodiment, a credit card device can include a piezoelectric effect generator that generates an electric charge or induces an electric current in response to realizing mechanical stress. The credit card device can also include a first integrated circuit that transmits financial transaction data to a point of sale device via a radio-frequency identification transmitter. The credit card device can also include a second integrated circuit that transmits information associated with the electric charge or induced electric current to the point of sale device, wherein the information associated with the electric charge or induced electric current facilitates enabling a financial transaction associated with the financial transaction data.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader, and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments, a piezoelectric device can be used to authenticate a user attempting to make a payment in order to authorize the payment. In an embodiment, the piezoelectric device can be embedded on a credit card, debit card, or other form of payment card and signals generated by the piezoelectric device can be used to authenticate the user when making the payment. For example, the user can squeeze or manipulate the piezoelectric device in a specific predetermined pattern and the resulting electric charge or induced electric current generated by the piezoelectric device can facilitate transmitting a signal to a point of sale device, and the point of sale device can authenticate the user based on the signal. In other embodiments, the piezoelectric device can contain circuitry and/or logic that can authenticate the user and send a confirmation signal to the point of sale device to authenticate the payment.

In another embodiment, the piezoelectric device can be a separate or stand-alone authenticator device and can authenticate other forms of payment, e.g., mobile payments, online payments, and other forms of payments not involving a physical credit card.

In an embodiment, the piezoelectric device can identify or send a signal that can facilitate identification or authorization of a user. Different users may have different conductive and/or resistive properties of their skin and tissue, and the electric field generated by, or powered by, the piezoelectric device can be modulated based on the properties of the user's fingers and/or hands. Based on this, different users will modulate the electric field and or charge and or current generated by the piezoelectric device in different ways, and so different users can be identified or authorized accordingly.

Figure 1:
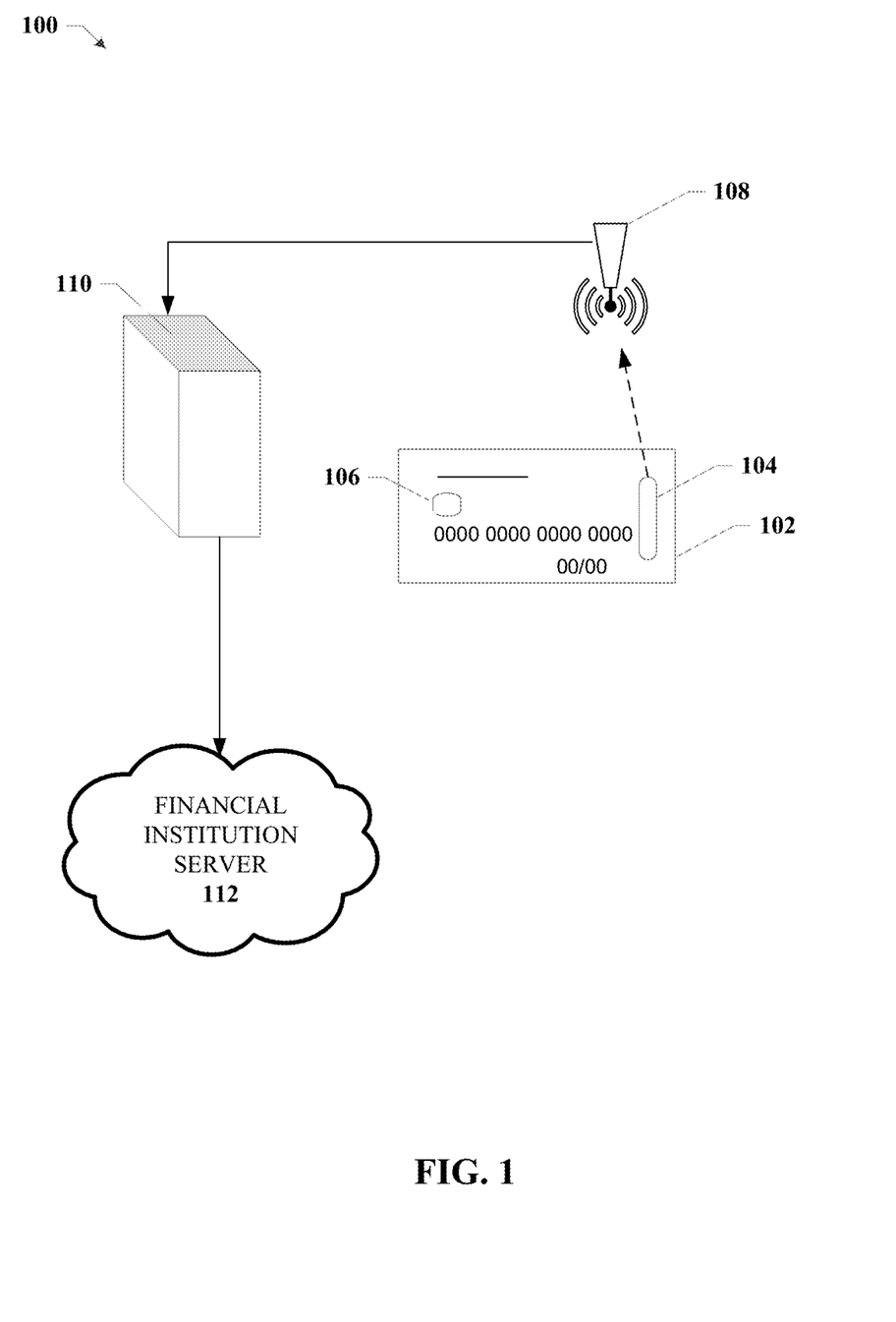
FIG. 1 is an illustration of an example system for authentication using a piezoelectric device on a credit card in accordance with one or more aspects of the disclosure.

Turning now to FIG. 1, illustrated is an example system 100 for authentication using a piezoelectric device on a credit card in accordance with one or more aspects of the disclosure. In the embodiment shown in FIG. 1, a credit card 102 can include a piezoelectric device 104 within the card. The piezoelectric device 104 can transmit a signal to a receiver 108 which can then forward the signal to a point of sale device 110 which is communicably coupled to a financial institution server 112. In an embodiment, the signal received by the receiver 108 from the piezoelectric device 104 can comprise a sequence or series of pulses that are generated by the piezoelectric effect resulting from squeezing or exerting pressure on the piezoelectric device 104. The signal can be analyzed by the point of sale device 110 or by the financial institution server 112 whether or not the signal meets a predetermined criterion with regard to the sequence or series of pulses. A predetermined sequence of squeezes can serve to identify the user or person squeezing the piezoelectric device 104 and can be used to authenticate a payment from credit card 102. Each piezoelectric device may generate its own signal, or modifying the signal, uniquely identifying the piezoelectric device.

In an embodiment, the piezoelectric device 104 can use the piezoelectric effect to generate a charge in response to applied mechanical stress. When piezoelectric material is placed under mechanical stress, a shifting of the positive and negative charge centers in the material takes place, which can results in an external electrical field. When reversed, an outer electrical field either stretches or compresses the piezoelectric material. The shifting charge centers can be used to facilitate generation or detection of an electrical signal where the current and/or voltage of the signal can vary in response to changing mechanical stress.

In an embodiment, the sequence of current and/or voltage changes can be used to authenticate the user using the credit card 102. In an embodiment, the authentication can be performed at the credit card 102, and in other embodiments, the authentication can be performed at the point of sale device 110 or the financial institution server 112. The authentication can be performed by comparing the sequence to a saved sequence that corresponds to the owner or approved user of the credit card 102. By way of example, a user can be assigned a sequence in some embodiments, and in other embodiments, the user can record their own sequence which can then be associated with their account. When the signal is analyzed, if the sequence matches the assigned or stored sequence within a predetermined range of similarity, the payment can be authorized.

In an embodiment, the authorization and/or authentication can be initiated in response to receiving a payment request. The payment request can be in response to swiping the credit card 102 at point of sale device 110. In other embodiments, the payment can be initiated when inserting the chip 106 of the credit card 102 into the point of sale device 110 and initiating the smartcard payment process. In other embodiments, the user of the credit card 102 can be authenticated before payment is initiated, and in yet other embodiments, the user can be authenticated before and during the payment process.

In an embodiment, the stored sequences that are associated with the users can be based on the frequency and amplitude of pulses associated with squeezing or manipulating the piezoelectric device 104. In an embodiment, the user can establish a pattern of squeezes with variable pauses and pulse lengths (due to squeezing the piezoelectric device 104 for different lengths of time). In an embodiment, the piezoelectric device 104 can be squeezed harder or softer creating pulses of higher or lower amplitude.

In an embodiment, the piezoelectric device 104 can comprise various sections or areas that may result in different and/or discernibly distinct signals when activated. Accordingly, the user's pattern can be based on hitting, touching, or squeezing different portions or areas of the piezoelectric device 104. In still other embodiments, the credit card device 102 can contain a plurality of piezoelectric devices, and the unique patterns can be based on the sequence in which each of the piezoelectric devices are activated.

Figure 2:
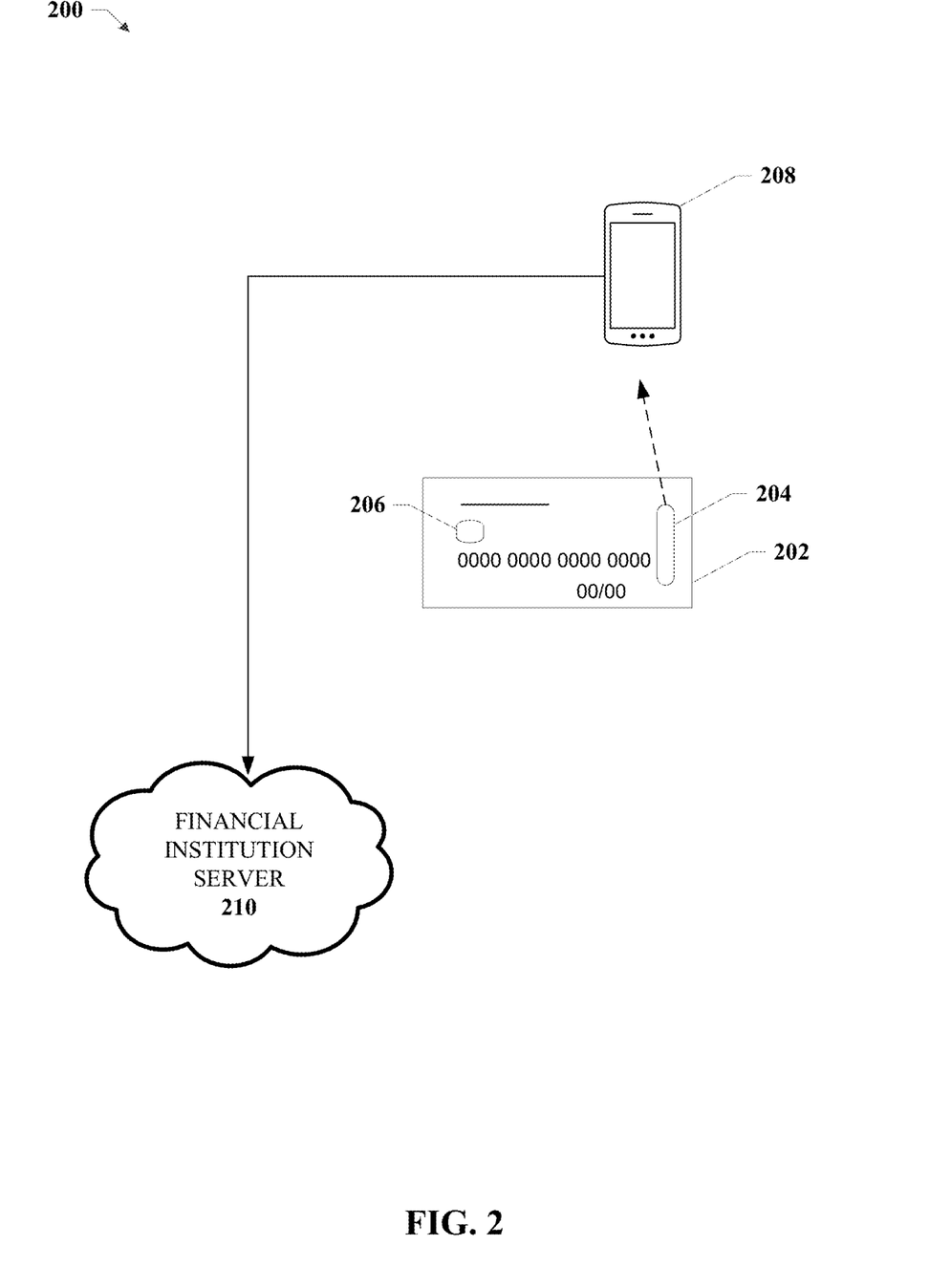
FIG. 2 is an illustration of an example system for authentication using a piezoelectric device for a mobile payment in accordance with one or more aspects of the disclosure.

Turning now to FIG. 2, illustrated is an example system 200 for authentication using a piezoelectric device for a mobile payment in accordance with one or more aspects of the disclosure.

In the embodiment shown in FIG. 2, a credit card device 202 can be used to facilitate a mobile payment via mobile device 208. It is to be appreciated that mobile device 208 can store credit card information, (e.g., from smart chip 206 or payment account information) the piezoelectric device 204 can still be used to authenticate a payment. In an embodiment, mobile device 208 can be used to input payment information on a website that forwards to a financial institution server 210. The mobile wallet application on mobile device 208 may indicate that further authentication is required or financial institution server 210 may indicate that further authentication is required, and mobile device 208 can issue a prompt requesting authentication. In response to the prompt, the user can enter the authenticating sequence or code using the piezoelectric device 204 and the credit card 202 or the piezoelectric device 204 can transmit the signal comprising the authenticating code to the mobile device 208 which can validate the code at the mobile device 208 or at the financial institution server 210 to facilitate the payment.

In an embodiment, the user, when initiating the payment using the credit card device 202, can input the authentication sequence using the piezoelectric device 204, and the credit card device 202 can transmit the signal comprising the authentication code and/or the payment information to the mobile device 208 without waiting for a prompt to do so from the financial institution server 210 or the mobile device 208.

It is to be appreciated that while the credit card device 202 shown in FIG. 2 has a smart chip 206 and a piezoelectric device 204 embedded thereon, in other embodiments, other configurations are possible. For example, the credit card device 202 may not have a smartchip 206 and may have a magnetic strip. The piezoelectric device 204 may be a standalone authenticator device not connected to the credit card 202, such that the credit card device 202 does not need to be used or handled when making mobile payments.

It is also to be appreciated that while FIG. 2 depicts the piezoelectric device 204 transmitting the authentication code to the mobile device 208, in other embodiments, the piezoelectric device 204 can transmit the code to the financial institution server 210 via a cellular network, POS device, WiFi internet connection, or any other communication protocol and/or means.

Figure 3:
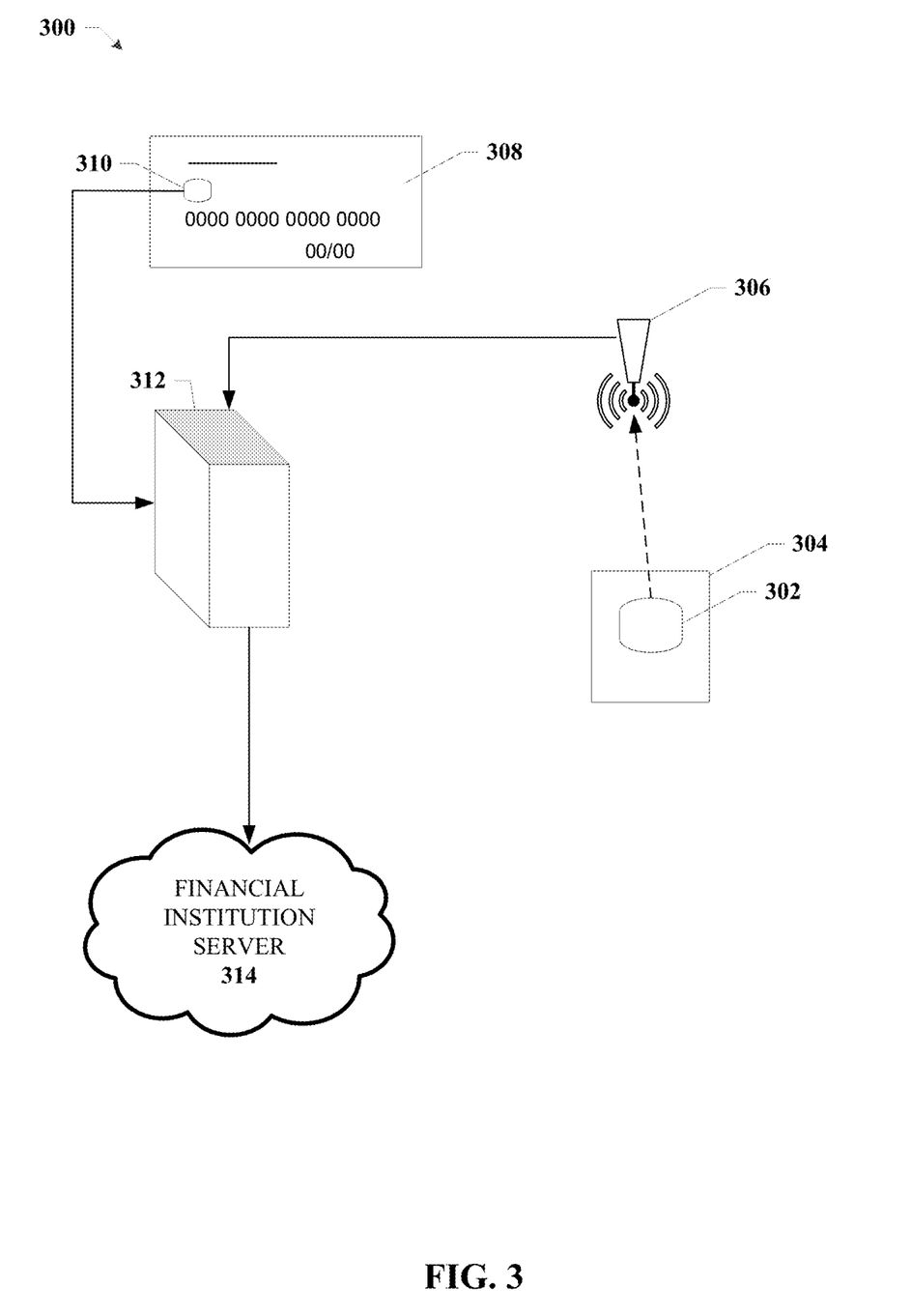
FIG. 3 is an illustration of an example system for authentication using a piezoelectric device separate from a credit card in accordance with one or more aspects of the disclosure.

Turning now to FIG. 3, illustrated is an example system 300 for authentication using a piezoelectric authenticator 304 separate from a credit card 308 in accordance with one or more aspects of the disclosure.

In the embodiment shown in FIG. 3, a credit card 308 can be used to make a payment at a POS device 312 and a standalone authenticator 304 can be used to authenticate the user making the payment. In response to receiving payment information from the credit card 308 via the smartchip 310 (or magnetic stripe in other embodiments), the POS device 312 can issue a prompt for the user to authenticate themselves. The user can enter a sequence that authenticates the user after transmitting the authentication code to the point of sale device 312 via a transceiver 306. The authenticator device 304 can include a piezoelectric device 302 that uses the piezoelectric effect to generate a charge in response to applied mechanical stress. When the piezoelectric material is placed under mechanical stress, a shifting of the positive and negative charge centers in the material takes place, which can result in an external electrical field. When reversed, an outer electrical field either stretches or compresses the piezoelectric material. The shifting charge centers can be used to facilitate generation of an electrical signal where the current and/or voltage and/or charge of the signal can vary in response to changing mechanical stress.

In an embodiment, the sequence of current and/or voltage and/or charge changes can be used to authenticate the user attempting to make a payment using the credit card 308. In an embodiment, the authentication can be performed at the point of sale device 312 or at the financial institution server 314. The authentication can be performed by comparing the sequence to a saved sequence that corresponds to the owner or approved user of the credit card 308. By way of example, a user can be assigned a sequence in some embodiments, and in other embodiments, the user can record their own sequence which can then be associated with their account. When the signal is analyzed, if the sequence matches the assigned or stored sequence within a predetermined range of similarity, the payment can be authorized.

In various embodiments, the transceiver 306 can transmit and receive near field communications protocols, WiFi, microwave, infrared, optical, cellular, and other communications protocols and technologies. In various embodiments, the authenticator device 304 can be unpowered, and the charge or induced current generated by the piezoelectric device 302 can send a low power transmission to the transceiver 306. In other embodiments, the authenticator device 304 can include a battery and/or other power source and amplify, boost, or otherwise perform signal processing on the signal from the piezoelectric device 302.

In an embodiment, the piezoelectric device 302 can transmit an authentication code that varies in frequency, duration, and amplitude of piezoelectric effect activations in order to authenticate the user. As the user squeezes harder, the amplitude of the piezoelectric effect can be greater in some embodiments, and the resulting signal amplitude increases. In other embodiments, the user can vary the length of time that the piezoelectric device 302 is squeezed changing the duration of the signal pulses.

In an embodiment, the piezoelectric device 302 can also be used to identify biometric data about the user that can be used to authenticate the user by comparing the signal to stored biometric data. In an embodiment, the piezoelectric device 302 can record fingerprint information, temperature information, skin composition information and grip information (pressure, anthropometry, and etc.). In other embodiments, the electromagnetic fields created by the piezoelectric device 302 can interact with the hand or other body parts of the user attenuating signals created by the piezoelectric device 302. The attenuation of the signals can be unique to each user based on their body composition, thus each user may modify the signal in different ways, and the modification can be used to identify users.

Figure 4:
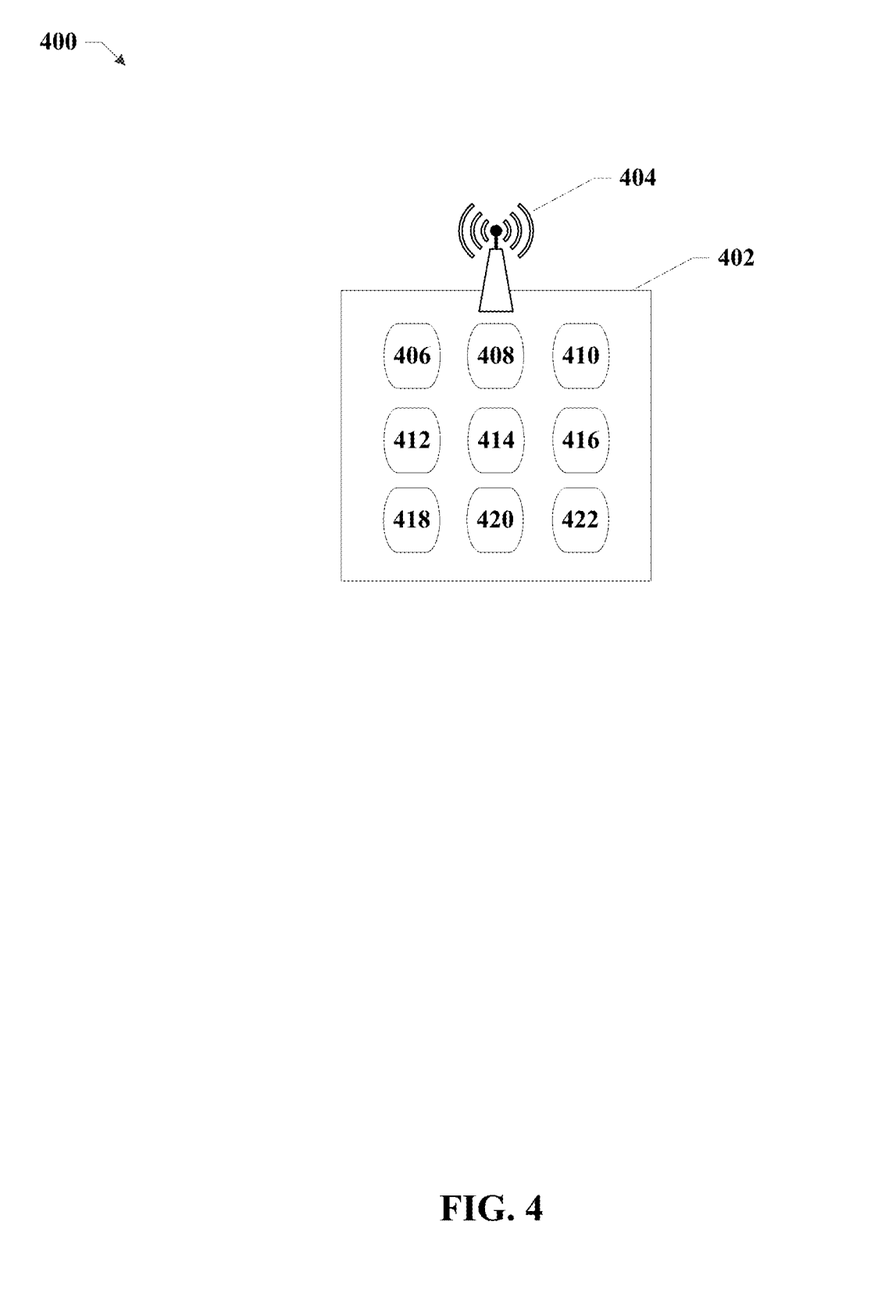
FIG. 4 is an illustration of an example piezoelectric security device in accordance with one or more aspects of the disclosure.

Turning now to FIG. 4, illustrated is an example piezoelectric security device system 400 in accordance with one or more aspects of the disclosure. The piezoelectric security device 402 shown in FIG. 4 can be a standalone authenticator device, (e.g. device 304) that can be used to authenticate a user making a mobile payment or a payment with a credit card at a POS device. The authenticator device 402 can include a transceiver 404 that can transmit and receive near field communications protocols, WiFi, microwave, infrared, optical, cellular, and other communications protocols and technologies. The authenticator device 402 can also include a set of separate piezoelectric devices 406, 408, 410, 412, 414, 416, 418, 420, and 422 that can be used in a sequence to authenticate the user. Each of the piezoelectric devices 406-422 can emit a distinct signal that can be tracked and the order in which the piezoelectric devices 406-422 are activated can be used to facilitate authenticating the user.

Figure 5:
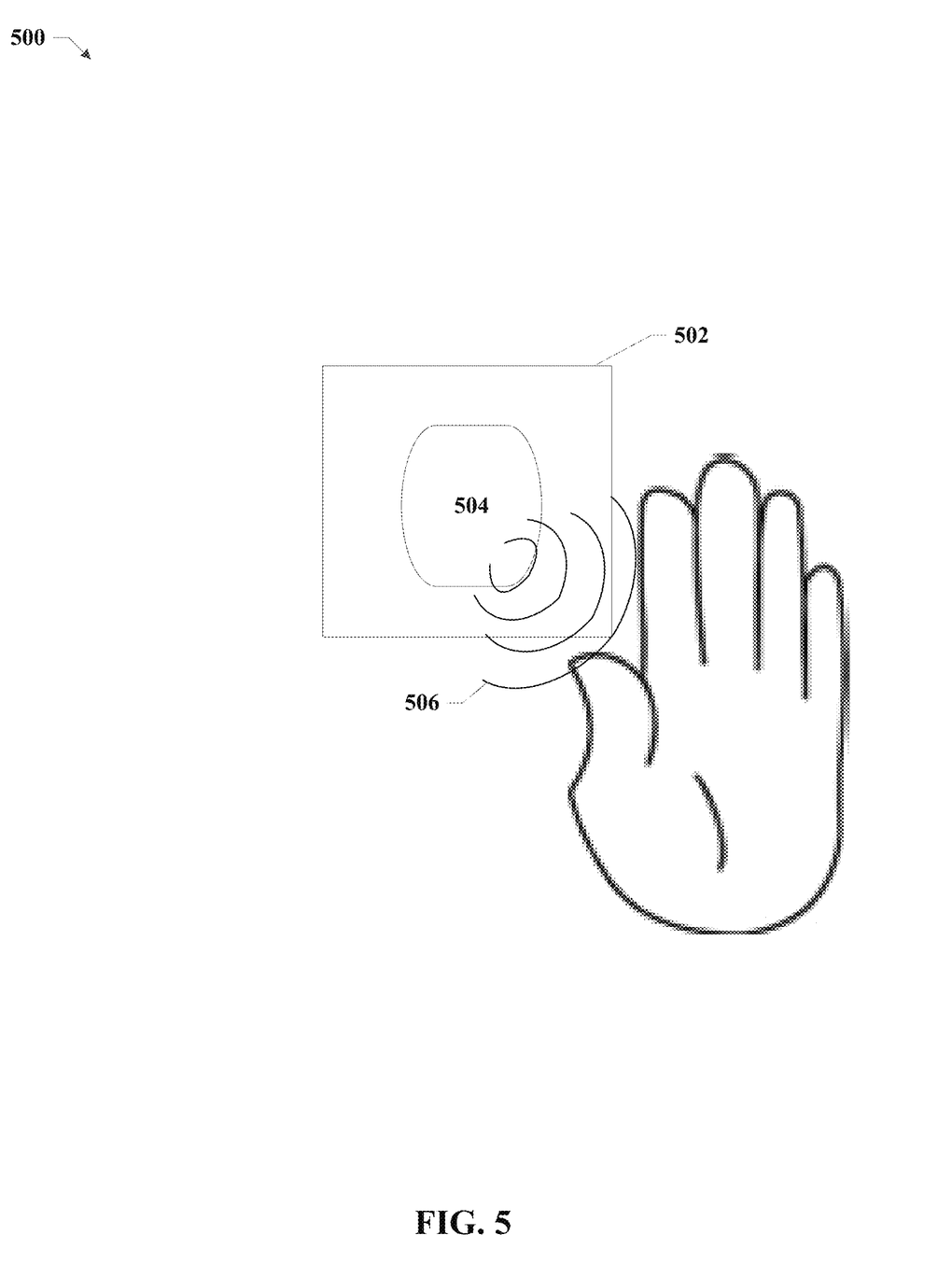
FIG. 5 is an illustration of an example piezoelectric security device that determines biometric information in accordance with one or more aspects of the disclosure.

Turning now to FIG. 5, illustrated is an example piezoelectric security device system 500 that determines biometric information in accordance with one or more aspects of the disclosure.

The authenticator device 502 can also be used to identify biometric data about the user that can be used to authenticate the user by comparing the signal to stored biometric data. In an embodiment, a piezoelectric device 504 on the authenticator device can record fingerprint information, temperature information, skin composition information, and grip information (pressure, anthropometry, and etc.). In other embodiments, the electromagnetic field 506 created or powered by the piezoelectric device 504 can interact with the hand or other body parts of the user attenuating signals created by the piezoelectric device 504. The attenuation of the signals can be unique to each user based on their body composition, thus each user may modify the signal in different ways, and the modification can be used to identify users.

It is to be appreciated that while FIG. 5 depicts a standalone authenticator device 502 using a piezoelectric device 504 to determine biometric data about a user in other embodiments, piezoelectric devices embedded on credit cards and debit cards can also be used to determine biometric data about users to facilitate authenticating users.

Figure 6:
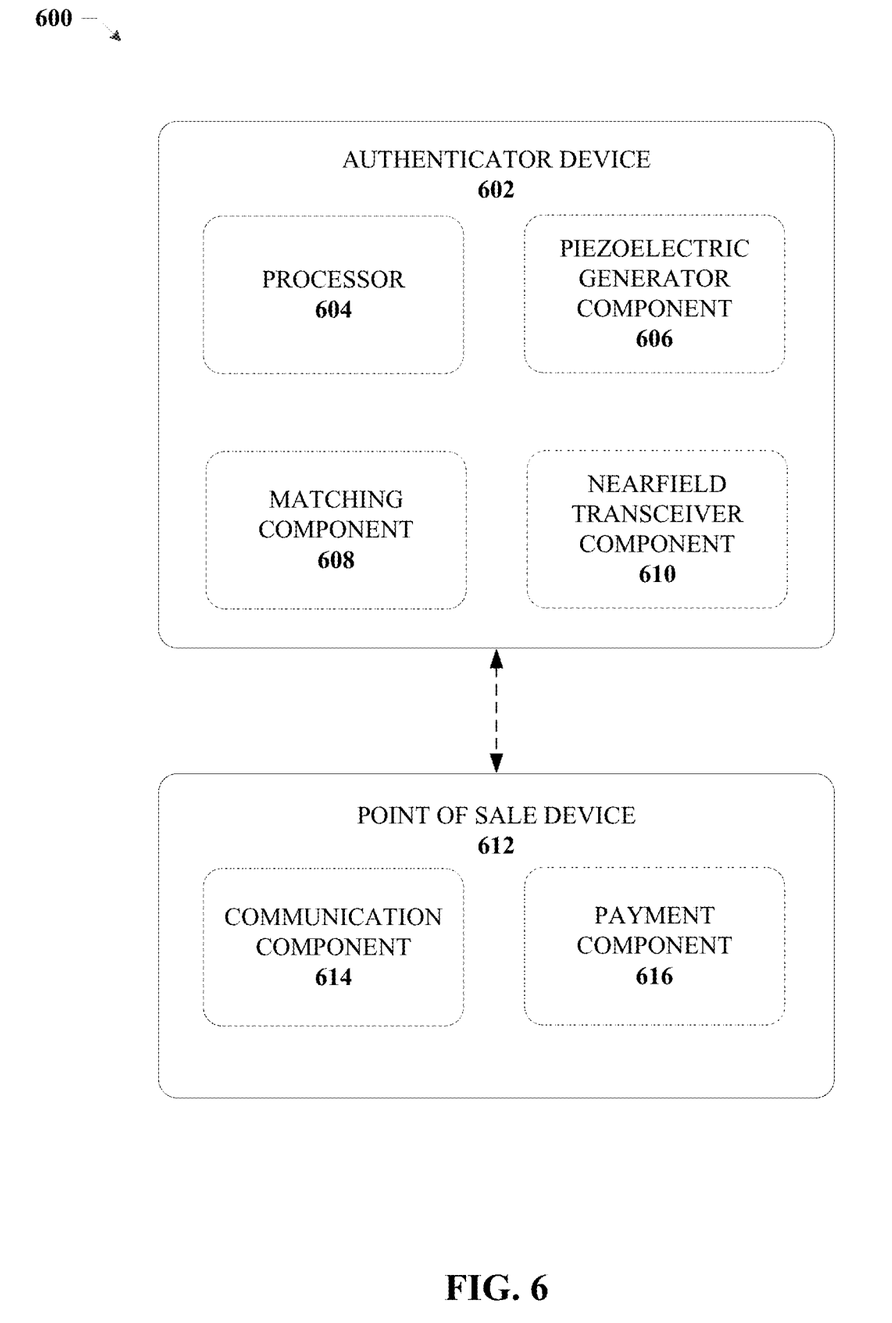
FIG. 6 is an illustration of an example system for authentication using a piezoelectric authenticator device in accordance with one or more aspects of the disclosure.

FIG. 6 illustrates an example system 600 for authentication using a piezoelectric authenticator device 602 in accordance with one or more aspects of the disclosure. The authenticator device 602 can generate an authentication code to send to a point of sale device 612 based on input received from a piezoelectric generator component 606.

In an embodiment, the point of sale device 612 can prompt the user to enter the code in response to the initiation of a payment by a payment component 616 on the point of sale device 612. The communication component 614 can prompt the payment via a display or audio component, and the user can squeeze or otherwise manipulate a piezoelectric portion of the authenticator device or a credit card in order to generate an authentication signal via the piezoelectric effect. A processor 604 and a matching component 608 can analyze the signal received from the piezoelectric generator component 606 to determine whether or not the code matches a predefined code associated with the user. If it matches, the nearfield transceiver component 610 can send a confirmation indication to the point of sale device 612 via the communication component 614 and the payment component 616 can complete the payment.

It is to be appreciated that in some embodiments, the matching component 608 can be located on the point of sale device 612 or on a financial institution server (not shown). In that case, the nearfield transceiver component 610 can send the signal generated by the piezoelectric generator component 606 to the point of sale device 612 directly without analyzing the signal to determine if it matches the user associated code.

In an embodiment, the predefined code can be learned by the processor 604 based on a signal received from the piezoelectric generator component 606 and stored in a memory on the device. In other embodiments, during a learning phase, the nearfield transceiver component 610 can send the signal to the point of sale device 612 or to the financial institution server for storage. If stored in the financial institution server, the matching component 608 can compare the signal from the piezoelectric generator component 606 to the stored pattern on the financial institution server during an authentication attempt.

Figure 7:
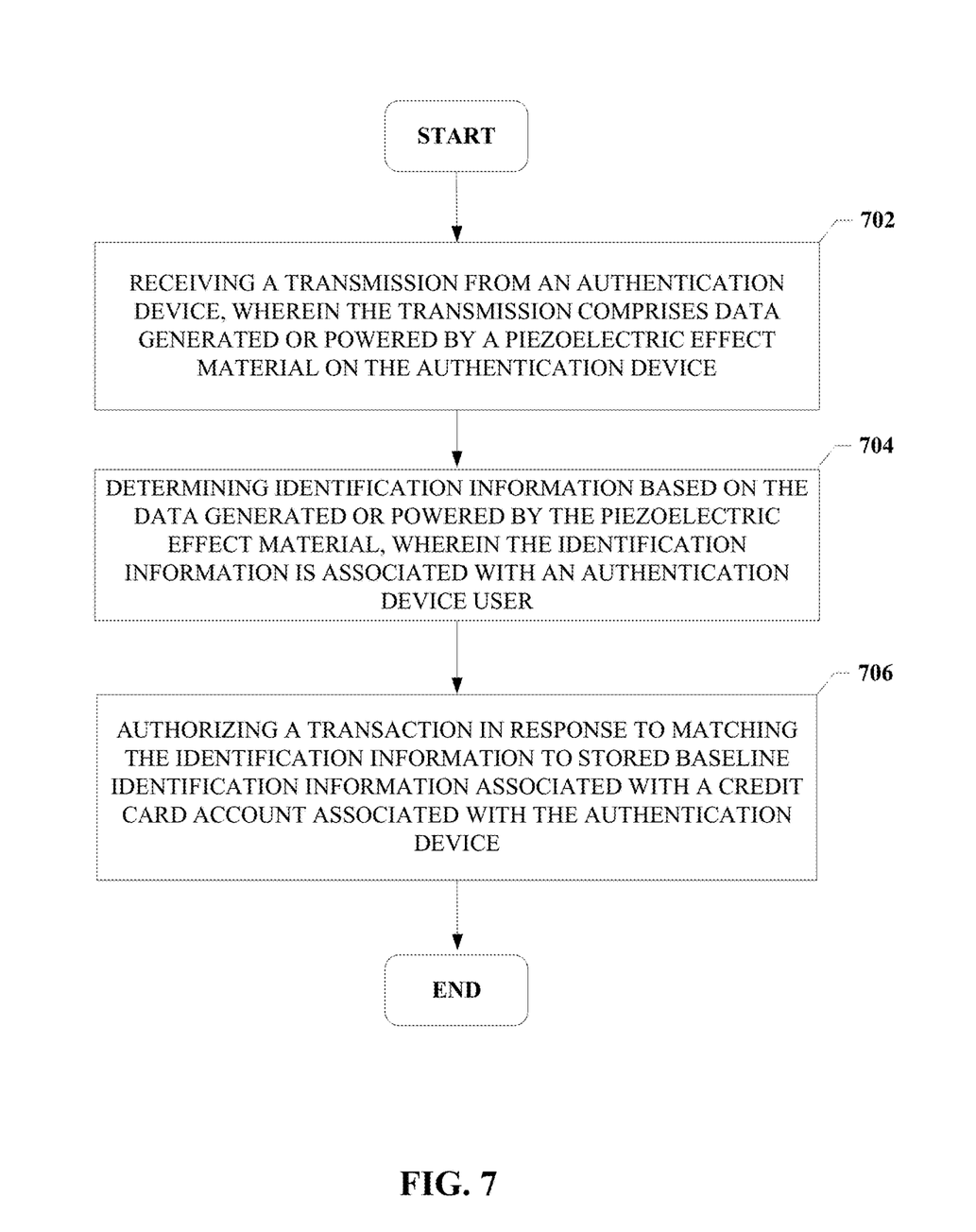
FIG. 7 is an illustration of an example flow chart of a method for authenticating a user with a piezoelectric security device according to one or more embodiments.
Figure 8:
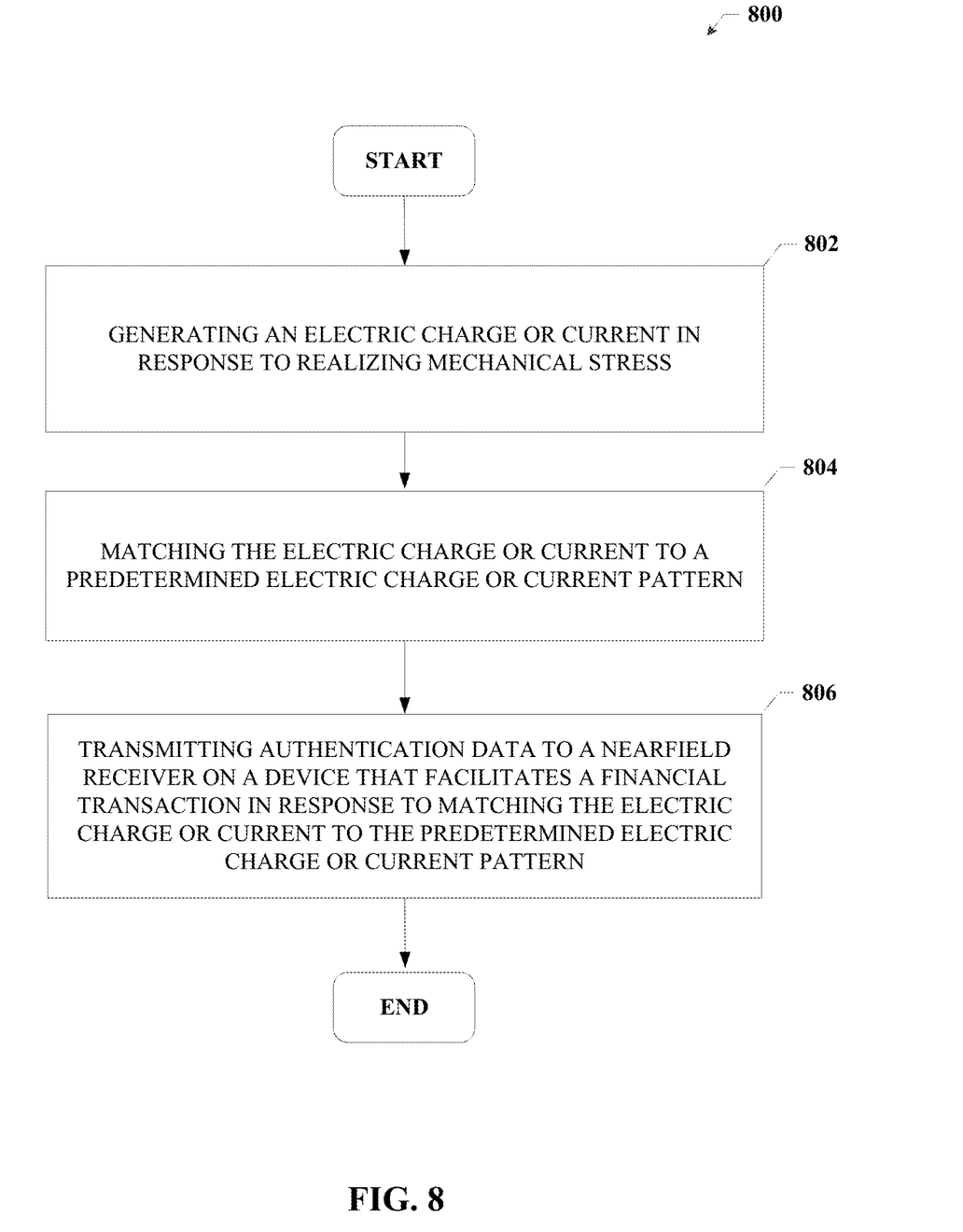
FIG. 8 is an illustration of an example flow chart of a method for authenticating a user with a piezoelectric security device according to one or more embodiments.

FIGS. 7-8 illustrate processes in connection with the aforementioned systems. The processes in FIGS. 7-8 can be implemented for example by systems 100, 200, 300, 400, 500 and 600, illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated an example flow chart of a method 700 for authenticating a user with a piezoelectric security device according to one or more embodiments.

The method can start at 702, where the method includes receiving a transmission from an authentication device, wherein the transmission comprises data generated or powered by a piezoelectric effect material on the authentication device.

At 704, the method includes determining identification information based on the data generated or powered by the piezoelectric effect material, wherein the identification information is associated with an authentication device user.

At 706, the method includes authorizing a transaction in response to matching the identification information to stored baseline identification information associated with a credit card account associated with the authentication device.

Turning now to FIG. 8, illustrated is an example flow chart of a method 800 for authenticating a user with a piezoelectric security device according to one or more embodiments.

At 802 the method includes generating an electric charge or current in response to realizing mechanical stress. At 804, the method includes matching the electric charge or current to a predetermined electric charge or current pattern. At 806, the method includes transmitting authentication data to a nearfield receiver on a device that facilitates a financial transaction in response to matching the electric charge or current to the predetermined electric charge or current pattern.

Figure 9:
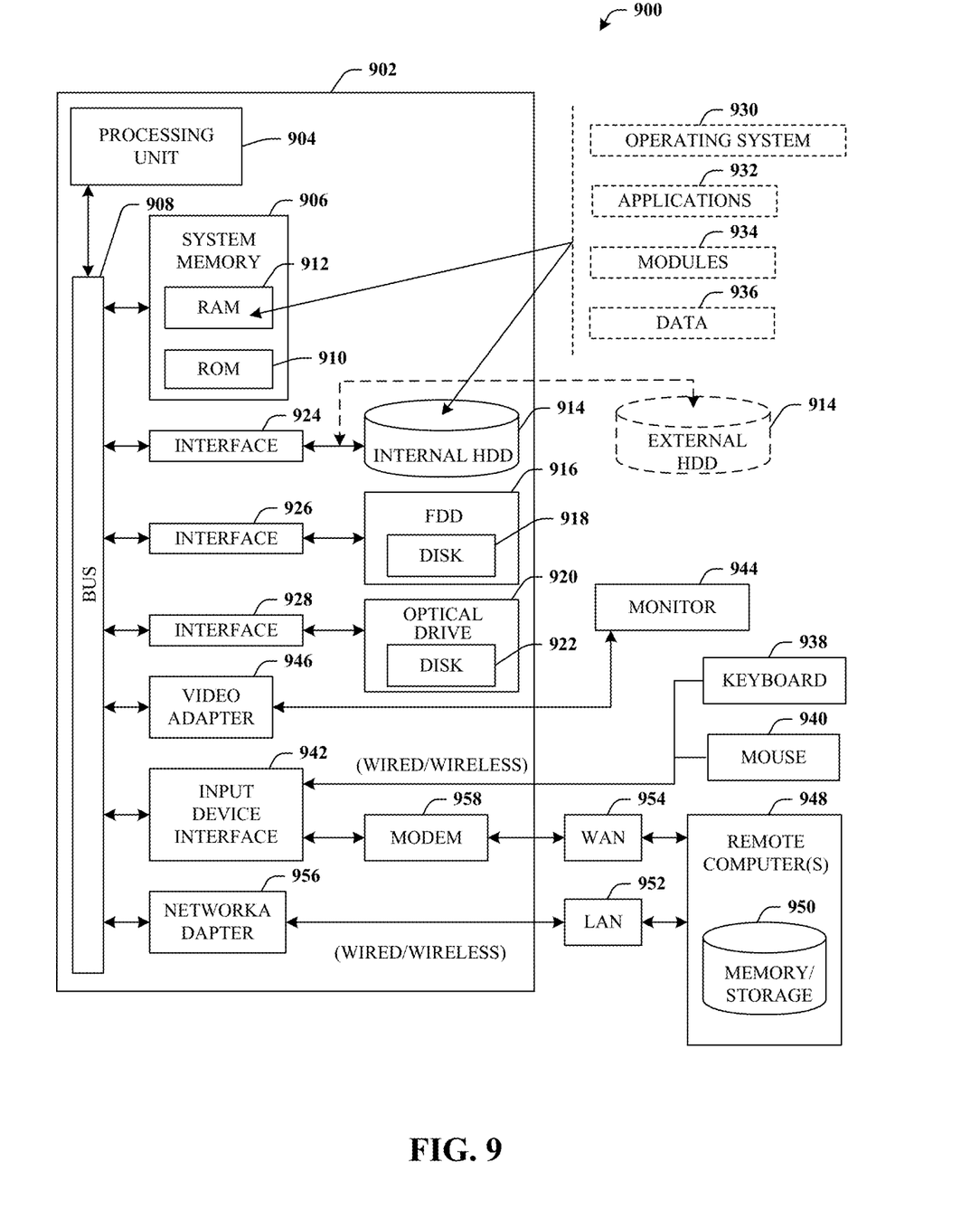
FIG. 9 is an illustration of an example computing environment where one or more of the provisions set forth herein are implemented, according to one or more embodiments.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory, or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
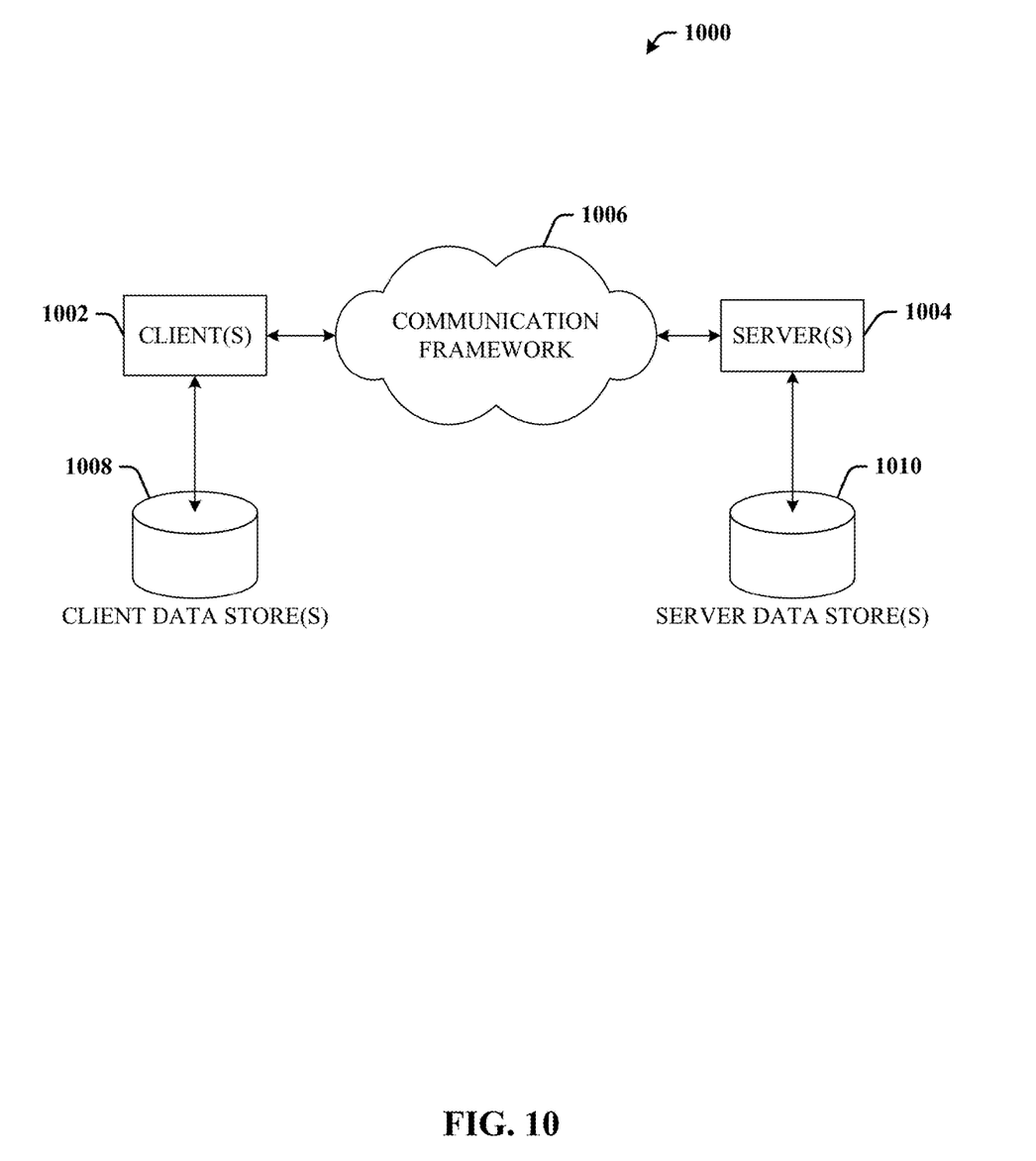
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   an authenticator device comprising a piezoelectric effect material embedded on the authenticator device, wherein the piezoelectric effect material generates an electrical signal having a pattern unique to a user of the authenticator device in response to mechanical stress applied to the piezoelectric effect material by a portion of the user's body; and
   a computing device comprising:
      a memory configured to store financial account information of the user and a predetermined signal pattern associated with the user; and
      a processor, communicatively coupled to the memory, configured to:
         initiate a financial transaction with a point of sale device using the financial account information of the user;
         detect the electrical signal generated by the piezoelectric effect material on the authenticator device;
         generate authentication data for the user based on matching the pattern of the detected electrical signal to the predetermined signal pattern associated with the user; and
         transmit the authentication data for the user to the point of sale device to facilitate authorization of the financial transaction.

2. The system of claim 1, wherein the authenticator device comprises a payment card.

3. The system of claim 1, wherein the processor of the computing device is configured to detect the electrical signal generated by the piezoelectric effect material embedded on the authenticator device using near field communication.

4. The system of claim 1, wherein the electrical signal having the pattern unique to the user comprises an electrical signal generated in response to a predetermined pressure sequence applied to the piezoelectric effect material on the authenticator device by the portion of the user's body.

5. The system of claim 4, wherein the predetermined pressure sequence comprises a directional pressure sequence.

6. The system of claim 1, wherein the electrical signal having the pattern unique to the user comprises an electrical signal generated in response to at least one of fingerprint, skin composition, or grip applied to the piezoelectric effect material on the authenticator device by the portion of the user's body.

7. The system of claim 1, wherein the electrical signal having the pattern unique to the user comprises an electromagnetic field having a pattern of attenuation that results from modification of the electromagnetic field generated by the piezoelectric effect material on the authentication device by skin composition of the portion of the user's body.

8. The system of claim 1, wherein the electrical signal having the pattern unique to the user generated by the piezoelectric effect material on the authenticator device comprises a series of charge, voltage, or current variations.

9. The system of claim 1, wherein the stored predetermined signal pattern associated with the user is based on information received from the user.

10. The system of claim 1, wherein the stored predetermined signal pattern associated with the user is based on learned information based on previous transactions.

11. A system comprising:
a payment card comprising:
an integrated circuit configured to generate a first signal including account information of the payment card to initiate a financial transaction with a point of sale device, and
a piezoelectric effect material embedded on the payment card, wherein when initiating the financial transaction, the piezoelectric effect material generates a second signal having a pattern unique to a user of the payment card in response to mechanical stress applied to the piezoelectric effect material by a portion of the user's body; and
a server device of a financial institution comprising:
a memory configured to store a predetermined signal pattern for the user; and
a processor, communicatively coupled to the memory, configured to:
receive an authorization request for the financial transaction from the point of sale device, the authorization request including the account information of the payment card from the first signal and the pattern of the second signal generated by the piezoelectric effect material embedded on the payment card, and
based on matching the pattern of the second signal to the predetermined signal pattern for the user, transmit a third signal authorizing the financial transaction at the point of sale device using the account information of the payment card.

12. The system of claim 11, wherein the predetermined signal pattern for the user is based on information received from the user.

13. The system of claim 11, wherein the predetermined signal pattern is based on learned information based on previous transactions.

14. The system of claim 11, wherein the integrated circuit of the payment card is configured to determine a direction of pressure received by the piezoelectric effect material on the payment card based on the second signal generated in response to mechanical stress applied to the piezoelectric effect material by the portion of the user's body.

15. The system of claim 11, wherein the integrated circuit of the payment card transmits the first signal including the account information of the payment card to the point of sale device via a radio-frequency identification transmitter.

16. The system of claim 15, wherein the integrated circuit of the payment card transmits the second signal having the pattern unique to the user via a nearfield transmitter distinct from the radio-frequency identification transmitter.

17. The system of claim 11, wherein the second signal having the pattern unique to the user comprises an electrical signal generated in response to a predetermined pressure sequence applied to the piezoelectric effect material on the payment card by the portion of the user's body.

18. The system of claim 11, wherein the second signal having the pattern unique to the user comprises an electrical signal generated in response to at least one of fingerprint, skin composition, or grip applied to the piezoelectric effect material on the payment card by the portion of the user's body.

19. The system of claim 11, wherein the second signal having the pattern unique to the user comprises an electromagnetic field having a pattern of attenuation that results from modification of the electromagnetic field generated by the piezoelectric effect material on the payment card by skin composition of the portion of the user's body.

20. The system of claim 11, wherein the second signal having the pattern unique to the user generated by the piezoelectric effect material on the payment comprises a series of charge, voltage, or current variations.

* * * * *